United States Patent [19]
Komoda et al.

[11] Patent Number: 5,832,391
[45] Date of Patent: Nov. 3, 1998

[54] PORTABLE TELEPHONE APPARATUS HAVING BUILT-IN OPTION CIRCUIT

[75] Inventors: Motoyoshi Komoda; Minoru Katsumata, both of Tokyo, Japan

[73] Assignee: NEC Corporation, Tokyo, Japan

[21] Appl. No.: 659,772

[22] Filed: Jun. 6, 1996

Related U.S. Application Data

[63] Continuation of Ser. No. 231,061, Apr. 22, 1994, abandoned.

[30] Foreign Application Priority Data

Apr. 26, 1993 [JP] Japan ..................................... 5-122032

[51] Int. Cl.$^6$ ....................................................... H04Q 7/32
[52] U.S. Cl. ............................................ 455/572; 455/564
[58] Field of Search ..................................... 379/428, 433;
455/90, 347, 348, 349, 422, 550, 556, 557,
558, 564, 565, 572; 429/7

[56] References Cited

U.S. PATENT DOCUMENTS

| | | |
|---|---|---|
| 4,887,311 | 12/1989 | Garner et al. ........................ 455/349 X |
| 5,020,094 | 5/1991 | Rash et al. .............................. 379/61 X |
| 5,136,229 | 8/1992 | Galvin . | |
| 5,287,554 | 2/1994 | Furuno ....................................... 455/89 |
| 5,465,401 | 11/1995 | Thompson .......................... 455/349 X |

FOREIGN PATENT DOCUMENTS

| | | |
|---|---|---|
| 9001293.3 | 5/1990 | Germany . |
| 3109829 | 5/1991 | Japan . |
| 4233853 | 8/1992 | Japan . |
| 4286444 | 10/1992 | Japan . |
| 5292165 | 11/1993 | Japan . |
| 0423733A2 | 4/1991 | United Kingdom . |
| 2251515 | 7/1992 | United Kingdom . |
| 0521609A | 1/1993 | United Kingdom . |

OTHER PUBLICATIONS

European Search Report.

*Primary Examiner*—Dwayne D. Bost
*Assistant Examiner*—William G. Trost
*Attorney, Agent, or Firm*—Whitman, Curtis & Whitman

[57] ABSTRACT

In a portable telephone apparatus selectively operable in a portable mode or in an on-board mode, an option circuit is built in a chargeable battery pack for adding an extra function to a telephone. A plurality of keys are arranged on the telephone and operable to cause the telephone and option circuit to interchange speech signals and control signals and to start and stop operating.

7 Claims, 2 Drawing Sheets

PORTABLE TELEPHONE APPARATUS HAVING BUILT-IN OPTION CIRCUIT

CROSS REFERENCE TO RELATED APPLICATIONS

This application is a continuation of U.S. patent application Ser. No. 08/231,061, filed Apr. 22, 1994, now abandoned.

BACKGROUND OF THE INVENTION

The present invention relates to a portable telephone apparatus selectively operable in a portable mode or in an on-board mode and having option circuits built in a chargeable battery pack for adding extra functions to the telephone.

It is a common practice with a portable telephone apparatus to add extra functions to a telephone by connecting or mounting an optional unit to or on the telephone. The optional unit has an extra function processing section for dealing with extra functions including a dual-tone multifrequency (DTMF) transmission/reception function. After the optional unit and the telephone have been connected by an exclusive multicore connector cable via respective interface connectors, a key or keys provided on the telephone are operated to activate the extra functions. In another conventional arrangement, connectors are mounted on the surface of a circuit board and connected to circuitry incorporated in the telephone. In this case, the optional circuits are implemented by a circuit board and mounted on the connector of the telephone for adding the DTMF transmission/reception function and other extra functions.

The cable connection scheme is taught in, for example, Japanese Patent Laid-Open Publication No. 3-109829 entitled "On-Board Adapter System for Portable Telephone". In this system, when a portable telephone is mounted on an on-board adapter, a battery thereof is charged. After information particular to the telephone has been transferred from the telephone to the on-board adapter, the telephone is usable in an on-board mode. This kind of scheme reduces the number of designing steps and the overall size of the system. However, the problem is that connecting the telephone and the optional unit by an exclusive connector cable complicates the construction and, moreover, leaves the telephone and the optional unit physically separate from each other. As a result, the whole apparatus is scaled up and is troublesome to operate when used as a portable telephone.

On the other hand, the built-in option circuit scheme is not practicable without resorting to the circuits and connectors for connecting the option circuits when the telephone begins to be used or being used. Therefore, the telephone has to be provided with even the circuits and connectors for option circuits which are not always essential. This scales up the apparatus and signal processing and increases the cost. With the system disclosed in Japanese Patent Laid-Open Publication No. 3-109829, it is impossible to add various kinds of functions to the portable telephone.

SUMMARY OF THE INVENTION

It is, therefore, an object of the present invention to provide a portable telephone apparatus which is scaled down both in configuration and signal processing and easy to operate despite the addition of various kinds of functions.

It is another object of the present invention to provide a portable telephone apparatus which allows various extra functions to be used both in a portable mode and in an on-board mode, thereby promoting easy and convenient operation.

It is another object of the present invention to provide a portable telephone apparatus which allows new functions to be added in the future.

A portable telephone apparatus of the present invention comprises a portable telephone having at least a plurality of keys, a display, and a transmitter/receiver, a chargeable battery pack removably mounted on the portable telephone and selectively electrically connected to or disconnected from the portable telephone, and an option circuit accommodated in the battery pack for adding an extra function to the portable telephone.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
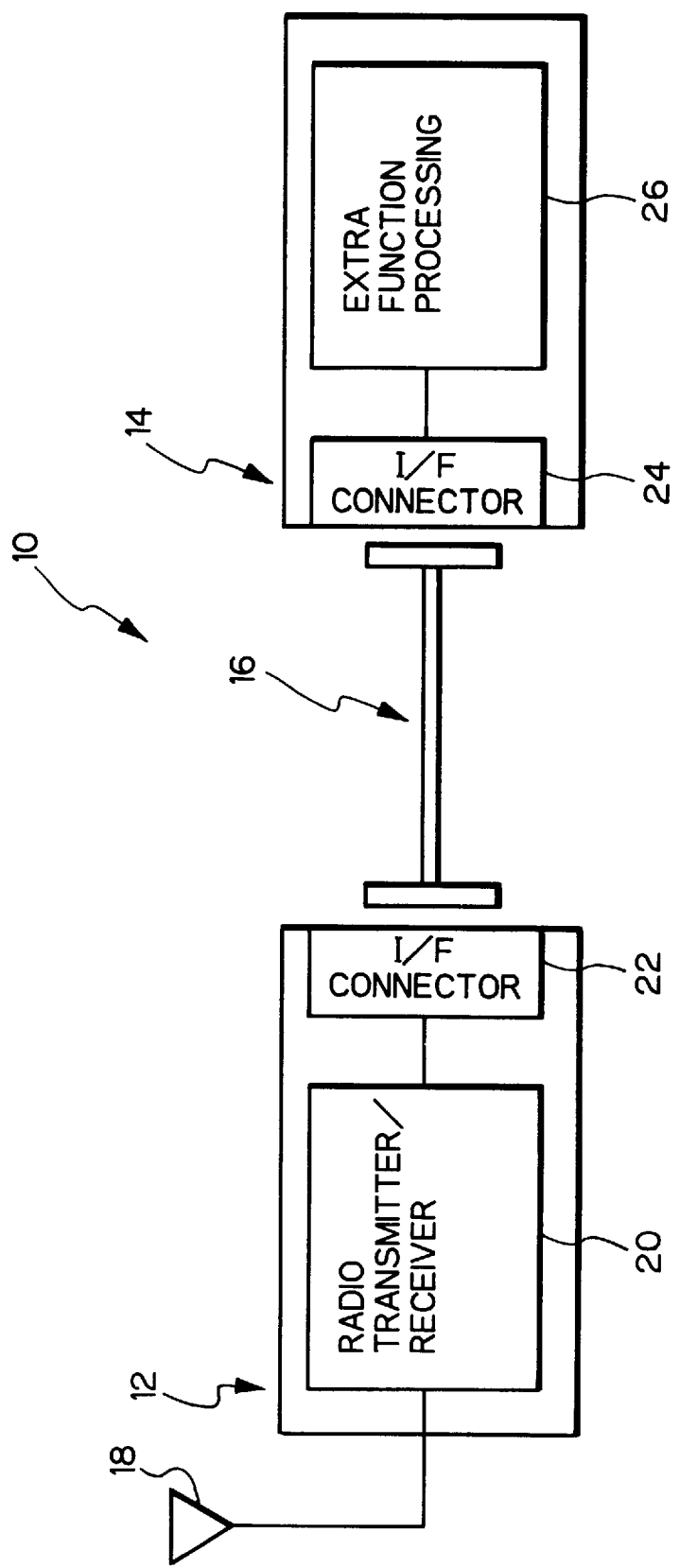
FIG. 1 is a block diagram schematically showing a conventional portable telephone apparatus.

To better understand the present invention, a brief reference will be made to a conventional portable telephone apparatus, shown in FIG. 1. As shown, the apparatus, generally 10, has a portable telephone 12, and an optional unit 14 connected to the telephone 12 by an exclusive multicore connector cable 16 for adding extra functions to the telephone 12. The telephone 12 has a whip antenna 18 for transmission and reception, a radio transmitter/receiver 20 for communicating with a remote telephone via the antenna 18, and an interface (I/F) connector 22 connected to the optional unit 14 via the connector cable 16. On the other hand, the optional unit 14 has an I/F connector 24 connected to the telephone 12 via the connector cable 16, and an extra function processing section 26 for dealing with new functions, including a DTMF transmission/reception function, to be added to the telephone 12. In this configuration, as the user of the telephone 12 manipulates, for example, a key provided on the telephone 12 to designate an extra function, the telephone 12 executes it. Such a conventional portable telephone apparatus, however, has some problems left unsolved, as discussed earlier.

Figure 2:
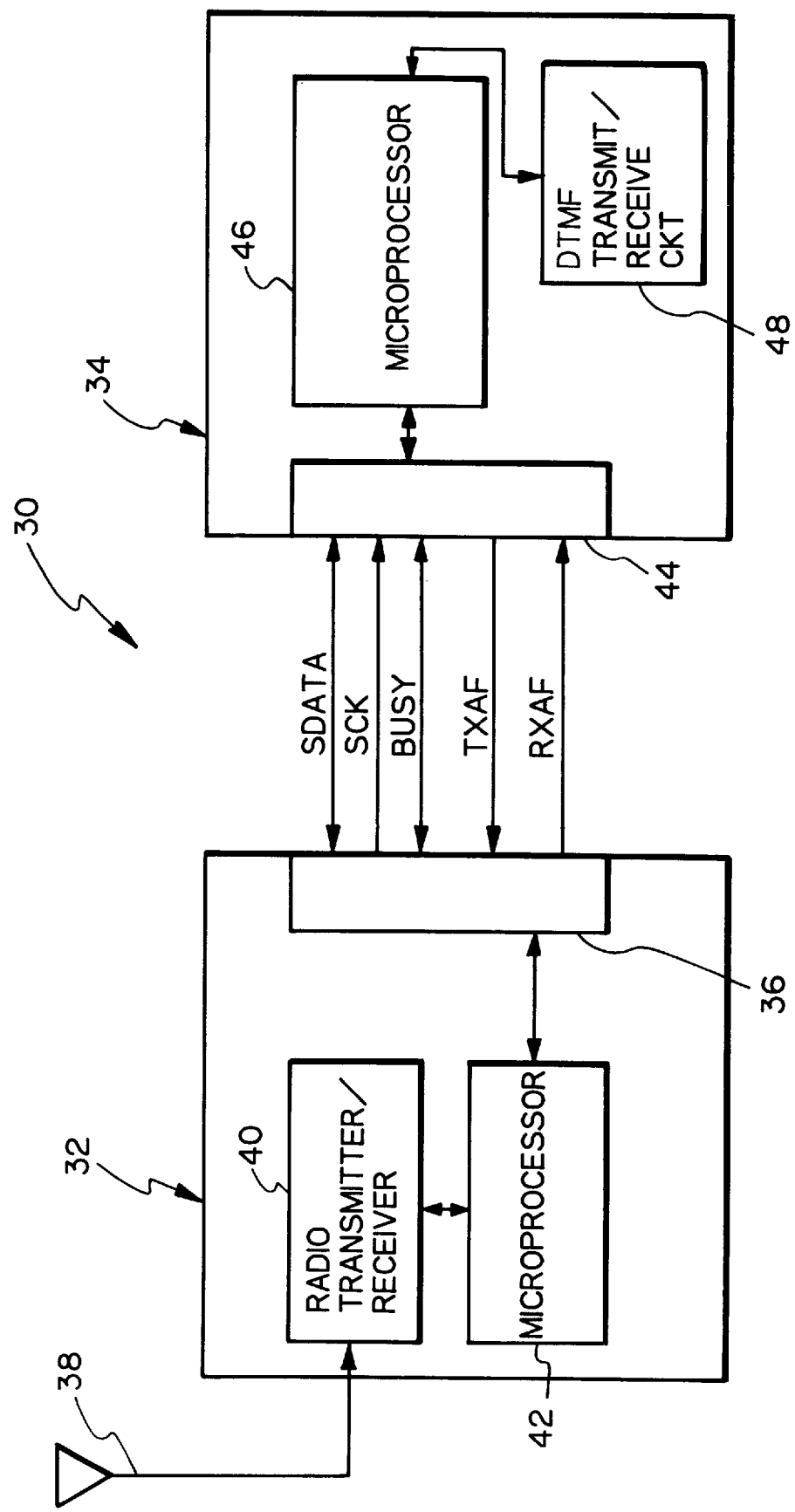
FIG. 2 is a schematic block diagram showing a portable telephone apparatus embodying the present invention.

Referring to FIG. 2, a portable telephone apparatus embodying the present invention is shown and generally designated by the reference numeral 30. As shown, the apparatus 30 is made up of a portable telephone 32 and a chargeable battery pack 34 mounted on the telephone 32. In the illustrative embodiment, the battery pack 34 accommodates a DTMF transmission/reception circuit for adding a DTMF transmission/reception function to the telephone 32. The telephone 32 has an I/F connector section 36 provided with resilient contacts, a whip antenna 38, a transmitter/receiver 40, and a one-chip microprocessor 42 for controlling the entire telephone 32.

The battery pack 34 has a resilient contact section 44, a one-chip microprocessor 46 accommodating an I/F connected to the contact section 44, and a DTMF transmission/reception circuit 48 to be controlled by the microprocessor 46. A chargeable battery, not shown, is received in the battery pack 34. The circuitry built in the battery pack 34 is activated and deactivated by commands entered on keys, not shown, which are provided on the telephone 32.

When the battery pack 34 is mounted on the telephone 32, the resilient contact section 44 is brought into contact with the resilient contacts of the I/F connector section 36. Specifically, the battery pack 34 and telephone 32 are connected by two bidirectional lines respectively assigned to serial data SDATA and a busy signal BUSY, a single clock line for a clock signal SCK, and two speech lines respectively assigned to a speech signal TXAF to be transmitted and a received speech signal RXAF. The signal BUSY shows that the IF connector section 36 of the telephone 32 is in use.

In operation, assume that the telephone 32, communicating with a remote telephone, has received a DTMF signal from the remote station. Then, data represented by the DTMF signal is displayed on a display, not shown, included in the telephone 32 under the control of the microprocessor 42. At the same time, the data is transferred to the battery pack 34 via the I/F connector section 36 and resilient contact section 44 under the control of the microprocessor 42. As a result, the data is written to a memory, not shown, built in the battery pack 34 under the control of the microprocessor 46. On the other hand, assume that the apparatus 30 sends, in the event of call terminating, a tone representative of an automatic response to a remote telephone. Then, a DTMF signal is received from the remote station after the transmission of the tone. This DTMF signal is also written to the memory installed in the battery pack 34. The resulting contents of the memory are sequentially read out or deleted in response to a command entered on a key which is provided on the telephone 32. Further, only if an address number included in the received DTMF signal is identical with an address number stored in a memory, not shown, also built in the battery pack 34, a ringer included in the telephone 32 is automatically driven to alert the user to the incoming call.

The telephone 32 and battery pack 34 interchange data, as follows. To begin with, the telephone 32 sends serial data SDATA synchronous with the clock SCK to the battery pack 34 as down-going data. The leading address of the serial data SDATA is indicative of data down-going from the telephone 32 to the battery pack 34. Before sending the serial data SDATA, the microprocessor 42 references the busy signal BUSY to see if the I/F connector section 36 is in use. This is successful in eliminating contention of up-going and down-going serial data SDATA.

Regarding up-going data from the battery pack 34 to the telephone 32, the microprocessor 46 of the battery pack 3 4 determines the status of the signal BUSY. If the I/F connector section 36 is not in use as indicated by the signal BUSY, the microprocessor 46 sends a clock request to the microprocessor 42 of the telephone 32 over the signal line BUSY. In response, the clock SCK is sent from the telephone 32 to the circuitry of the battery pack 34 under the control of the microprocessor 42. Then, serial data SDATA is sent from the battery pack 34 to the telephone 32 in synchronism with the clock SCK. In this way, the telephone 32 and battery pack 34 share a single clock SCK in processing data. Further, the received speech signal RXAF and the speech signal TXAF to be sent are interchanged between the telephone 32 and the battery pack 34.

As stated above, the option circuits of the battery pack 34 can be accommodated in the space available in the battery pack 34 and, therefore, do not increase the overall size of the apparatus 30. Moreover, even when new function are added in the figure, all that is required is to change the option circuits built in the battery pack 34 together with a program.

In summary, it will be seen that the present invention provides a portable telephone apparatus in which a plurality of keys provided on a telephone are operable to effect the interchange of speech signals and control signals between the telephone and option circuits built in a battery pack, while activating and deactivating the option circuits. Hence, the apparatus is desirably scaled down and is easy to handle when used in a portable mode, compared to the conventional apparatus which implements various extra functions by means of option circuits (adapters) and a cable for connecting them to a telephone. Furthermore, the apparatus does not need a connection circuit which would be required for an option circuit built in a portable telephone. This scales down signal processing while further scaling down the entire apparatus. In addition, when the apparatus is used as an on-board telephone while being charged, various extra functions can be used as they are. Therefore, the extra functions are available for both of a portable telephone and an on-board telephone. This is desirable from the convenience standpoint and, in addition, allows other functions to be readily added in the future.

Various modifications will become possible for those skilled in the art after receiving the teachings of the present disclosure without departing from the scope thereof.

What is claimed is:

1. A portable telephone apparatus comprising:
    a portable telephone having a plurality of keys, a display, and a transmitter/receiver;
    a chargeable battery pack removably mounted on said portable telephone and selectively electrically connected to and disconnected from said portable telephone, said chargeable battery pack supplying power necessary to operate said portable telephone; and
    an option circuit located in said battery pack for adding an extra user function to said portable telephone, said option circuit comprising a microprocessor connected to a dual-tone multifrequency (DTMF) circuit.

2. An apparatus as claimed in claim 1, wherein said portable telephone and said option circuit interchange speech signals and control signals with each other.

3. An apparatus as claimed in claim 1, wherein said plurality of keys are operable to cause said portable telephone and said option circuit to interchange speech signals and control signals and said plurality of keys selectively start and stop operating of said option circuit.

4. A multi-function rechargeable battery pack for replacing a standard battery pack in a portable telephone, comprising:
    a rechargeable battery for providing all necessary power to said portable telephone;
    a microprocessor having a memory;
    a dual-tone multifrequency (DTMF) circuit for receiving data from said microprocessor and transmitting data to said microprocessor; and
    a connector for supplying electrical power from said battery to said portable telephone and for supplying data lines for transferring telephonic data between said microprocessor in said rechargeable battery pack and said portable telephone.

5. A multi-function rechargeable battery pack as recited in claim 9 wherein said telephonic data comprises voice data, dual-tone multifrequency data, and digital data.

6. A multi-function rechargeable battery pack as recited in claim 9 wherein said telephonic data is stored in said memory.

7. A multi-function rechargeable battery pack as recited in claim 11 wherein said telephonic data stored in said memory is uploaded to the portable telephone when a key on the telephone is activated.

* * * * *